United States Patent
Bland et al.

(10) Patent No.: US 7,640,725 B2
(45) Date of Patent: Jan. 5, 2010

(54) PILOT FUEL FLOW TUNING FOR GAS TURBINE COMBUSTORS

(75) Inventors: Robert J. Bland, Oviedo, FL (US); William R. Ryan, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 569 days.

(21) Appl. No.: 11/330,596

(22) Filed: Jan. 12, 2006

(65) Prior Publication Data

US 2007/0157624 A1    Jul. 12, 2007

(51) Int. Cl.
    *F02C 9/00* (2006.01)
(52) U.S. Cl. ........................ 60/39.281; 60/776
(58) Field of Classification Search ............. 60/776, 60/737, 39.281
    See application file for complete search history.

(56) References Cited

U.S. PATENT DOCUMENTS

| | | | |
|---|---|---|---|
| 4,265,085 A | | 5/1981 | Fox et al. |
| 4,394,811 A | | 7/1983 | Swick |
| 5,319,936 A | * | 6/1994 | Ikeda et al. .................. 60/737 |
| 5,465,570 A | | 11/1995 | Szillat et al. |
| 5,802,584 A | * | 9/1998 | Kool et al. .................. 711/154 |
| 5,806,299 A | | 9/1998 | Bauermeister et al. |
| 5,836,164 A | * | 11/1998 | Tsukahara et al. ............. 60/733 |
| 5,974,781 A | | 11/1999 | Correa et al. |
| 6,082,111 A | | 7/2000 | Stokes |
| 6,205,765 B1 | | 3/2001 | Iasillo et al. |
| 6,381,947 B2 | | 5/2002 | Emmons |
| 6,408,611 B1 | | 6/2002 | Keller et al. |
| 6,425,239 B2 | | 7/2002 | Hoffmann et al. |
| 6,490,867 B2 | * | 12/2002 | Braun et al. .................. 60/776 |
| 6,532,726 B2 | | 3/2003 | Norster et al. |
| 6,698,207 B1 | | 3/2004 | Wiebe et al. |
| 6,742,341 B2 | | 6/2004 | Ryan et al. |
| 6,763,664 B2 | | 7/2004 | Aoyama |
| 6,848,260 B2 | | 2/2005 | North et al. |
| 6,877,307 B2 | | 4/2005 | Ryan et al. |
| 2001/0027639 A1 | | 10/2001 | Emmons |
| 2003/0061817 A1 | | 4/2003 | Aoyama |
| 2004/0194468 A1 | | 10/2004 | Ryan et al. |

\* cited by examiner

*Primary Examiner*—Michael Cuff
*Assistant Examiner*—Phutthiwat Wongwian

(57) ABSTRACT

A method and system for controlling combustion in a gas turbine combustor (18) includes adjusting an amount of a premix fuel portion (30) of a pilot fuel (28) provided to a premix burner stage (48) of a pilot (46) of the gas turbine combustor. The amount of the premix fuel portion is adjusted from a preset premix fuel portion amount to an adjusted premix fuel portion amount to achieve a desired first operating condition of the combustor. An amount of a diffusion fuel portion (34) of the pilot fuel provided to a diffusion burner stage (50) of the pilot is then adjusted from a preset diffusion fuel portion amount to an adjusted diffusion fuel portion amount to achieve a desired second operating condition of the combustor.

13 Claims, 1 Drawing Sheet

PILOT FUEL FLOW TUNING FOR GAS TURBINE COMBUSTORS

FIELD OF THE INVENTION

The present invention relates generally to gas turbines, and, more particularly, to controlling fuel flows to a pilot of a combustor of a gas turbine to achieve a desired lowered pollutant emission while maintaining dynamic stability of the combustor.

BACKGROUND OF THE INVENTION

Gas turbine engines are known to include a compressor for compressing air, a combustor for producing a hot gas by burning fuel in the presence of the compressed air produced by the compressor, and a turbine for expanding the hot gas to extract shaft power. The design of a gas turbine combustor is complicated by the necessity for the gas turbine engine to operate reliably with a low level of emissions, such as oxides of nitrogen (NOx), at a variety of power levels. In addition, it is important to ensure the stability of the flame to avoid unexpected flameout and damaging levels of acoustic vibration. A relatively rich fuel/air mixture will improve the stability of the combustion process but will have an adverse affect on the level of emissions. A careful balance must be achieved among these various constraints in order to provide a reliable machine capable of satisfying very strict modern emissions regulations over a wide range of loading conditions. A pilot flame is commonly used to stabilize the flame. However, the pilot is a diffusion flame that produces a significant amount of NOx.

Staging is the delivery of fuel to the combustion chamber through at least two separately controllable fuel supply systems or stages. Staging is known as a method to control combustion in a gas turbine combustor. A staged gas turbine combustor pilot is described in U.S. Pat. No. 6,877,307 as having a premix stage wherein air and fuel are premixed prior to being combusted in a pilot combustion region to achieve reduced pollutant emission.

Traditionally, gas turbine engine settings for a land-based powder generation turbine are manually "tuned" by a combustion engineer during the start-up of the power plant in order to satisfy appropriate emissions criteria without exceeding dynamic load limitations. As emission limits become increasingly stringent, low NOx combustors must be operated increasingly close to their physical limits and operational margins become smaller. A power plant turbine may be required to operate for days, weeks or even months. During such extended intervals, many variables affecting the combustion conditions may change. For example, the temperature and humidity of the ambient combustion air may change, the fuel characteristics may change, and the combustion system components are subject to wear and drift over time.

BRIEF DESCRIPTION OF THE DRAWINGS

The invention is explained in the following description in view of the drawings that show.

DETAILED DESCRIPTION OF THE INVENTION

While gas turbine pilots having a two or more stages may be capable of providing lower overall emissions than a pilot having only a single stage, fuel control of the stages to achieve optimum combustion conditions has proven difficult. For example, fuel flow changes in one stage may affect the combustion characteristics in the other stage and vice versa. In addition, one stage may be exhibit a sharp or more rapid dynamic response in the presence of changing fuel flows than another stage. For, example, in a two stage pilot having a diffusion stage and a premix stage, it has been observed that a 0.2% to 0.3% change in an amount of a fuel fraction provided to the premix stage may cause the premix stage to exhibit an intermediate frequency dynamic instability while the diffusion stage dynamics remain relatively insensitive to such changes. Accordingly, tuning of respective pilot stages to achieve desired emissions and stability may be prohibitively time consuming or computationally intensive. The inventors have innovatively realized that by first setting a stage having a faster dynamic response characteristic than a second stage of a two stage pilot to achieve a first desired operating condition, and then setting the second stage to achieve a second desired operating condition, tuning may be achieved more quickly and easily compared to conventional techniques. Advantageously, stability of the first stage may be maintained while tuning the second stage.

Figure 1:
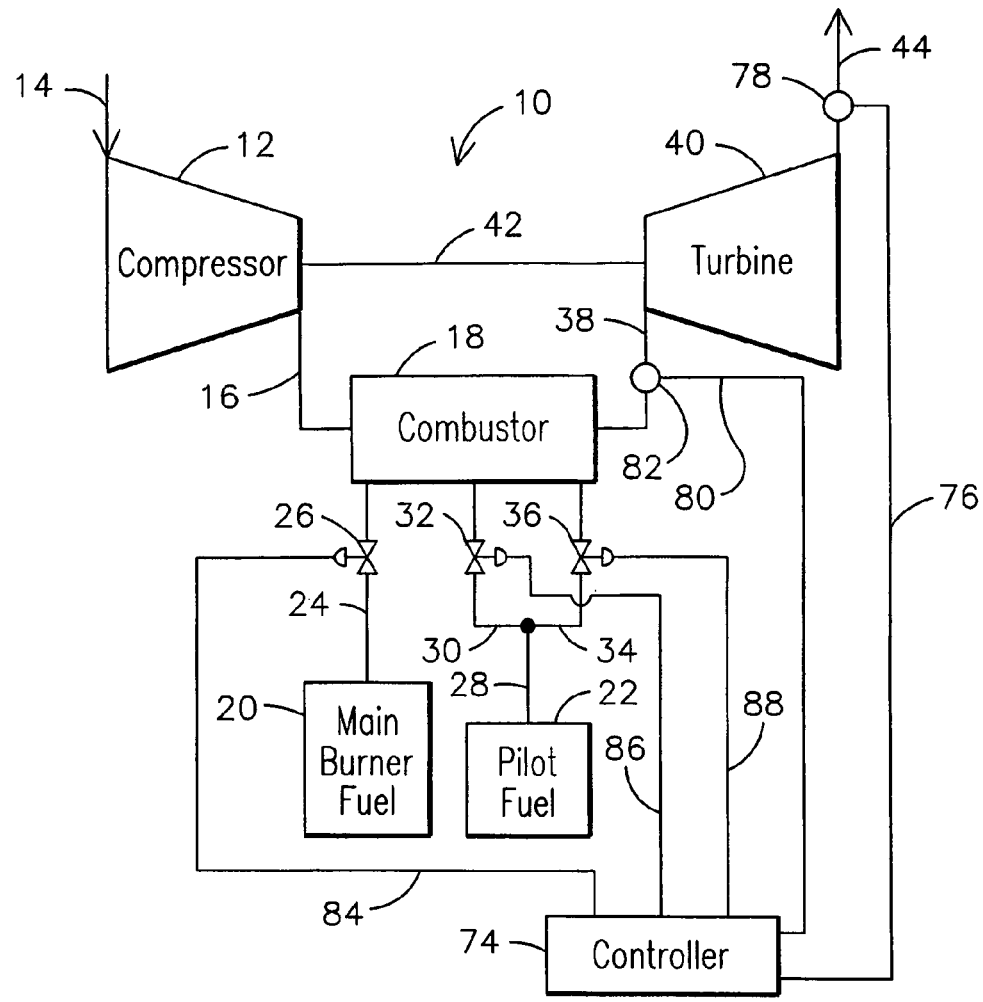
FIG. 1 is a functional diagram of an exemplary embodiment of a gas turbine system including an improved method of pilot fuel flow control.

FIG. 1 shows a gas turbine 10 including a compressor 12 for receiving ambient air 14 and for providing compressed air 16 to a combustor 18. The combustor 18 also receives combustible fuel, for example, from a main burner fuel supply 20 and from a pilot fuel supply 22. The main fuel supply 22 may supply main burner fuel 24 to a main burner of the combustor 18 through a main fuel supply valve 26. The pilot fuel supply 22 may supply pilot fuel 28 to a pilot of the combustor 18. In an embodiment, the pilot fuel 28 may be split into a first fuel portion 30 and a second fuel portion 34 supplied through respective valves 32, 36. In another embodiment, separate first and second pilot fuel supplies may used to supply the respective first fuel portion 30 and second fuel portion 34 through corresponding valves 32, 36. Combustion of the combustible fuels 24, 28 supplied to the combustor 18 in the compressed air 16 results in the supply of hot combustion gas 38 to turbine 40, wherein the hot combustion gas 38 is expanded to recover energy in the form of the rotation of shaft 42 that is used, in turn, to drive the compressor 12. The turbine exhaust 44 is delivered back to the ambient atmosphere.

Figure 2:
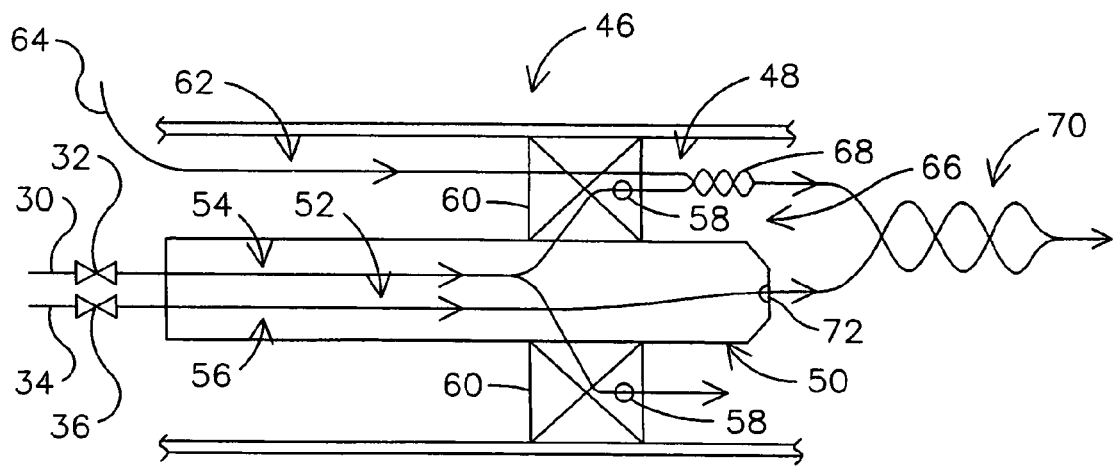
FIG. 2 is a schematic cross-sectional diagram of an exemplary embodiment of a two stage pilot of the gas turbine of FIG. 1.

FIG. 2 is a schematic cross-sectional diagram of an exemplary embodiment of a two stage pilot disposed within the combustor 18 of the gas turbine 10 of FIG. 1. In the embodiment depicted in FIG. 2, the pilot 46 may include a first stage, such as a premix burner stage 48, and a second stage, such as a diffusion burner stage 50. In an embodiment, the diffusion stage 50 may be positioned in a central region 52 of the pilot 46 and the premix stage 48 may be annularly disposed around the diffusion stage 50. The pilot 46 includes a premix fuel flow path 54 delivering the first fuel portion 30, such as a premix fuel portion, of the pilot fuel flow to the premix burner stage 48. The pilot 46 also includes a diffusion fuel flow path 56 delivering the second fuel portion 34, such as a diffusion fuel portion, of the pilot fuel flow to the diffusion stage 50. Valves 32, 36 may be positioned in the respective fuel flow paths 54, 56 for controlling the first fuel portion 30 and second fuel portion 34 flowing therethrough. The premix fuel path 54 may discharge the premix fuel portion from openings 58 in swirler vanes 60 disposed in a pilot air flow path 62 receiving a pilot portion 64 of the compressed air. The swirler vanes 60 may be positioned upstream of an outlet 66 of the pilot 46 to generate a fuel/air premixture 68 discharged into a downstream pilot combustion zone 70. The diffusion fuel flow path 56 may discharge the second fuel portion 34 from an opening 72 directly into the downstream pilot combustion zone 68 to mix with the fuel/air mixture 68 and be combusted therein.

Returning to FIG. 1, the gas turbine 10 is provided with a controller 74 for implementing steps necessary for controlling the flow of fuels 24, 30, 34 to the combustor 18 to achieve desired operating conditions of the combustor 18. Controller 74 may take any form known in the art, for example an analog or digital microprocessor or computer, and it may be integrated into or combined with one or more controllers used for other functions related to the operation of the gas turbine 10. The steps necessary for such processes may be embodied in hardware, software and/or firmware in any form that is accessible and executable by controller 74 and may be stored on any medium that is convenient for the particular application.

In an aspect of the invention, the controller 74 receives an input signal 76 from an emission analyzer 78 such as may be part of a continuous emissions monitoring system provided as part of the gas turbine 10. In one embodiment, emission analyzer 78 may be a NOx sensor. Other types of sensors may be used in other applications, depending upon the emission control requirements for a particular application. Controller 74 may also receive an input signal 80 from a dynamics sensor 82. Dynamics sensor 44 may be a pressure sensor, an acoustic sensor, an electromagnetic energy sensor, or other type of sensor known in the art for sensing dynamic parameter fluctuations responsive to fluctuations in the combustion process. The controller 36 may have outputs 84, 86, 88 for controlling the position of respective valves 26, 32, 36 to control amounts of the main fuel 24 and pilot fuels 30, 34 provided to the respective stages 48, 50 of the pilot 46 as shown in FIG. 2.

The controller 74 may be configured for controlling combustion in the gas turbine combustor 18. A method for controlling combustion in the gas turbine combustor 18 may include adjusting an amount of the first fuel portion 30, such as the premix fuel portion, of the pilot fuel 28 provided to the premix burner stage 48 to achieve a desired operating condition of the combustor 18. Typically, the pilot 46 is operated according to preset fuel flow values corresponding to a fuel flow table that specifies fuel amounts, such as a fuel fraction of the total pilot fuel, delivered to the respective stages 48, 50. The values stored in fuel flow table may correspond to certain load ranges and environmental operating conditions, such as ambient temperature and/or humidity. For example, when the gas turbine 10 is being operated in a load range of about 50% to 100% of a base load rating of the gas turbine, 92% of the pilot fuel 28 may be provided to the premix stage 48 as the preset premix fuel portion amount and 8% of the pilot fuel 28 may be provided to the diffusion stage 56 as the preset diffusion fuel portion amount.

In an embodiment, the preset premix fuel portion amount may be reduced to an adjusted premix fuel portion amount to achieve an operating condition of the combustor 18 that may be closer to a dynamic instability condition than a condition maintained at a preset level. A reduction in the preset premix fuel portion amount advantageously results in a corresponding reduction of pollutant formation. A dynamic operating condition of the combustor 18 may be monitored while reducing the premix fuel portion amount until a desired dynamic operating condition is achieved, such as when a dynamic frequency spike having an amplitude exceeding a certain limit is detected. Upon reaching the desired dynamic operating condition, the adjusted premix fuel portion amount may then be further adjusted by increasing the adjusted premix fuel portion amount to provide a desired margin away from the desired dynamic operating condition. For example, when the desired dynamic condition is reached, the adjusted premix fuel portion amount may be increased by about 0.1% to 0.5% of the preset premix fuel portion amount, or more preferably about 0.25% to 0.4% of the preset premix fuel portion amount.

In another embodiment, an amount of adjustment of the premix fuel portion amount may be limited, for example, regardless of whether a desired dynamic operating condition is achieved. In an exemplary aspect, an adjustment limit may be set at 0.5% of the preset premix fuel portion amount. Accordingly, when attempting to adjust the premix fuel portion amount to reach a desired dynamic operating condition, the premix fuel portion amount is only allowed to be reduced by 0.5% of the preset premix fuel portion amount, even if the desired dynamic operating condition has not been reached. In other words, a difference between the preset premix fuel portion amount and the adjusted premix fuel portion amount may be limited so that a difference between these two amounts is no more than a desired difference in a range of about 0.25% to 0.75%, and preferably in a range of about 0.4% to 0.6%.

Once the premix stage 48 is set to achieve the desired operating condition, the diffusion stage 50 may then be adjusted. The diffusion fuel portion may be adjusted from a preset diffusion fuel portion amount to an adjusted diffusion fuel portion amount to achieve a desired second operating condition of the combustor 18 that may be closer to a dynamic instability condition than a condition maintained at a preset level. In an embodiment, a pollutant emission operating condition may be monitored while reducing the diffusion fuel portion amount until a desired pollutant emission operating condition is achieved, such as a lowered NOx emission level. While performing the diffusion fuel portion amount reduction operation, a dynamic operating condition of the combustor 18 may also be monitored to ensure that the combustor 18 does not become dynamically unstable, using, for example, a technique such as described in U.S. Pat. No. 6,877,307. For example, when a dynamic frequency spike having an amplitude exceeding a certain limit (indicative of operating close to a dynamic instability condition) occurs while lowering the amount of the diffusion fuel portion, further lowering of the amount may be aborted even though a desired pollutant emission operating condition may not have been reached. The diffusion fuel portion amount may be increased at this point, or left to remain at the edge of dynamic instability, because it has been observed that the diffusion stage exhibits a slower dynamic response characteristic than, for example the premix stage. Accordingly, there may be more time to perform further adjustments to the diffusion flow if dynamic instability increases reaching the adjusted diffusion fuel portion amount.

After adjusting the diffusion fuel portion amount to achieve the desired second operating condition, the amount may be further adjusted, for example, responsive to a change in the second operating condition, while allowing the adjusted preset premix fuel portion amount to remain the same. In another aspect, the above steps of tuning the premix and diffusion fuel portion amounts may be performed responsive to a change in an operating environment of the combustor 18, such as a change in ambient conditions or load conditions.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for controlling combustion in a gas turbine pilot combustor, comprising:
    adjusting a premix fuel flow amount of a pilot fuel flow provided to a premix burner stage of a pilot of a gas turbine combustor from a preset premix fuel flow amount to an adjusted premix fuel flow amount to achieve a first operating condition of the combustor that is closer to a dynamically unstable condition than before the premix fuel flow amount was adjusted, in order to reduce pollutant formation; and
    adjusting subsequently a diffusion fuel flow amount of the pilot fuel flow provided to a diffusion burner stage of the pilot from a preset diffusion fuel flow amount to an adjusted diffusion fuel flow amount to achieve a second operating condition of the combustor that closer to a dynamically unstable condition than before the diffusion fuel flow amount was adjusted, in order to further reduce pollutant formation.

2. The method of claim 1, further comprising, after adjusting of the diffusion fuel flow amount, further adjusting only the diffusion fuel flow amount in response to a change in operating condition in order to return to the second operating condition.

3. The method of claim 1, further comprising performing the steps of claim 1 responsive to a change in an operating environment of the combustor.

4. The method of claim 1, wherein the first operating condition comprises a predetermined dynamic condition of the combustor.

5. The method of claim 4, wherein when the predetermined dynamic condition is reached, the adjusted premix fuel flow amount is then adjusted by about 0.1% to 0.5% of the preset premix fuel flow amount to achieve an adjusted first operating condition that is more dynamically stable than the first operating condition.

6. The method of claim 1, further comprising adjusting the premix fuel flow amount to achieve a difference between the preset premix fuel flow amount and the adjusted premix fuel flow amount that is no more than a difference limit.

7. The method of claim 6, wherein the difference limit is about 0.25% to 0.75% of the preset premix fuel flow amount.

8. The method of claim 1, wherein the second operating condition comprises a dynamic condition of the combustor.

9. The method of claim 1, wherein the second operating condition comprises an emission condition of the combustor.

10. The method of claim 1, wherein the method is implemented only when a main gas turbine combustor is being operated in a load range of about 50% to 100% of a base load rating of the gas turbine.

11. The method of claim 1, further comprising establishing a dynamically stable preset diffusion fuel flow amount provided to the diffusion stage of the pilot burner and a dynamically stable preset premix fuel flow amount provided to the premix stage of the pilot burner;
    wherein adjusting the premix fuel flow amount comprises reducing the premix fuel flow amount from the dynamically stable preset premix fuel flow amount without adjusting the diffusion fuel flow amount while monitoring combustion dynamics of the burner; and
    wherein adjusting the diffusion fuel flow amount comprises reducing the diffusion fuel flow amount from the preset diffusion fuel flow amount without adjusting the premix fuel flow amount while monitoring the combustion dynamics of the burner.

12. The method of claim 11, further comprising terminating the reduction in the diffusion fuel flow amount in response to achieving a first of either a predetermined combustion dynamics setpoint or a predetermined pollutant formation setpoint.

13. The method of claim 12, further comprising adjusting the diffusion fuel flow amount of the pilot fuel only without adjusting the premix fuel flow amount in response to a change in an ambient condition or a load condition of the gas turbine engine in order to maintain the second operating condition.

* * * * *

UNITED STATES PATENT AND TRADEMARK OFFICE
CERTIFICATE OF CORRECTION

| | |
|---|---|
| PATENT NO. | : 7,640,725 B2 |
| APPLICATION NO. | : 11/330596 |
| DATED | : January 5, 2010 |
| INVENTOR(S) | : Bland et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 927 days.

Signed and Sealed this

Sixteenth Day of November, 2010

David J. Kappos
*Director of the United States Patent and Trademark Office*